United States Patent
Whipple et al.

(10) Patent No.: US 10,235,209 B2
(45) Date of Patent: Mar. 19, 2019

(54) HYBRID TASK FRAMEWORK

(71) Applicant: VMware, Inc., Palo Alto, CA (US)

(72) Inventors: Mark Bryan Whipple, Golden, CO (US); Sachin Thakkar, San Jose, CA (US); Debashis Basak, San Jose, CA (US); Serge Maskalik, Los Gatos, CA (US); Narendra Kumar Basur Shankarappa, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 136 days.

(21) Appl. No.: 14/839,180

(22) Filed: Aug. 28, 2015

(65) Prior Publication Data
US 2017/0060621 A1    Mar. 2, 2017

(51) Int. Cl.
*G06F 9/50* (2006.01)
*H04L 29/08* (2006.01)
(52) U.S. Cl.
CPC .......... *G06F 9/5055* (2013.01); *G06F 9/5072* (2013.01); *H04L 67/16* (2013.01); *H04L 67/34* (2013.01)
(58) Field of Classification Search
None
See application file for complete search history.

(56) References Cited

U.S. PATENT DOCUMENTS

| | | | | |
|---|---|---|---|---|
| 5,978,830 A * | 11/1999 | Nakaya | ............... | G06F 8/456 718/102 |
| 2002/0188691 A1* | 12/2002 | Ignatius | ............... | G06F 3/0613 709/208 |
| 2007/0234129 A1* | 10/2007 | Shukla | ............... | G06Q 10/06 714/39 |
| 2010/0223618 A1* | 9/2010 | Fu | ............... | G06F 9/5044 718/102 |
| 2011/0113011 A1* | 5/2011 | Prorock | ............... | G11B 27/36 707/634 |
| 2011/0205586 A1* | 8/2011 | Takahashi | ............... | G06F 9/5027 358/1.15 |
| 2011/0299112 A1* | 12/2011 | Ota | ............... | G06F 3/1211 358/1.15 |
| 2012/0102487 A1* | 4/2012 | Cahill | ............... | G06F 9/5077 718/1 |
| 2014/0007121 A1* | 1/2014 | Caufield | ............... | G06F 9/4843 718/103 |

* cited by examiner

*Primary Examiner* — Shih-Wei Kraft
(74) *Attorney, Agent, or Firm* — Loza & Loza, LLP (57) ABSTRACT

Techniques for executing jobs in a hybrid cloud computing system. A job defines multiple states and tasks for transitioning between states. Jobs are passed between systems that execute different tasks via a message bus, so that the different tasks may be executed. A job manager controls execution flow of jobs based on a job descriptor that describes the job.

18 Claims, 5 Drawing Sheets

HYBRID TASK FRAMEWORK

BACKGROUND

Cloud architectures are used in cloud computing and cloud storage systems for offering infrastructure-as-a-service (IaaS) cloud services. Examples of cloud architectures include the VMware vCloud Director® cloud architecture software, AmazonEC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. The use of such public cloud services is typically kept separate from the use of existing computing resources in data centers managed by an enterprise. With an increasing trend in migrating data centers to cloud platforms, there is an increasing demand for a hybrid model of executing workflows seamlessly across public cloud services and data center computing resources.

SUMMARY

Embodiments of the present disclosure provide a method for executing jobs in a hybrid cloud computing system. The method includes inserting a first job to a first job queue for execution, the first job queued with a first state that identifies a task of the first job for execution. The method also includes retrieving the first job from the job queue. The method further includes determining that a location associated with the first state is a remote location within the hybrid cloud computing system that includes an off-premise computing system and an on-premise computing system. The method also includes transmitting the first job to the remote location for execution by a service subscribed to execute the first job at the first state.

Further embodiments include a non-transitory computer-readable storage medium storing instructions that cause a computer to carry out the above method and a system for performing the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
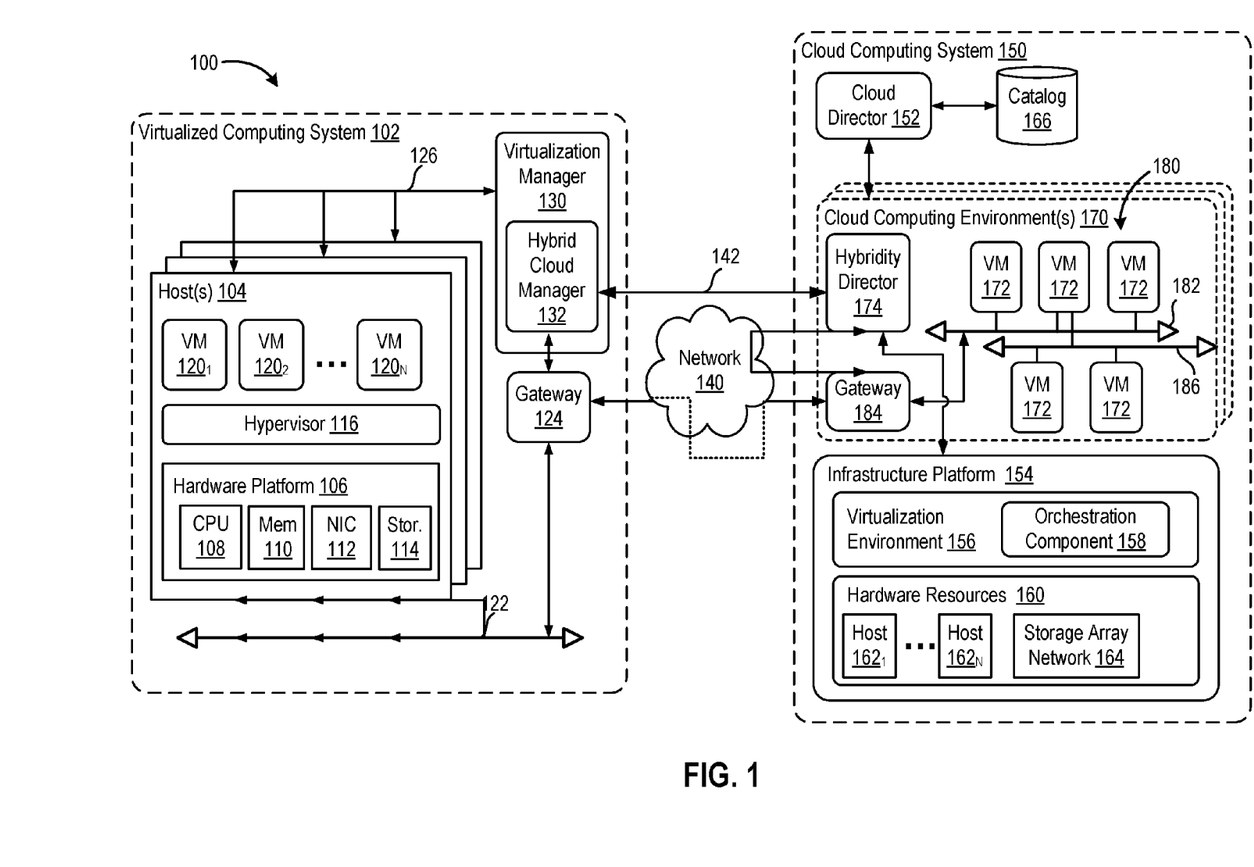
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and MICROSOFT® Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2:
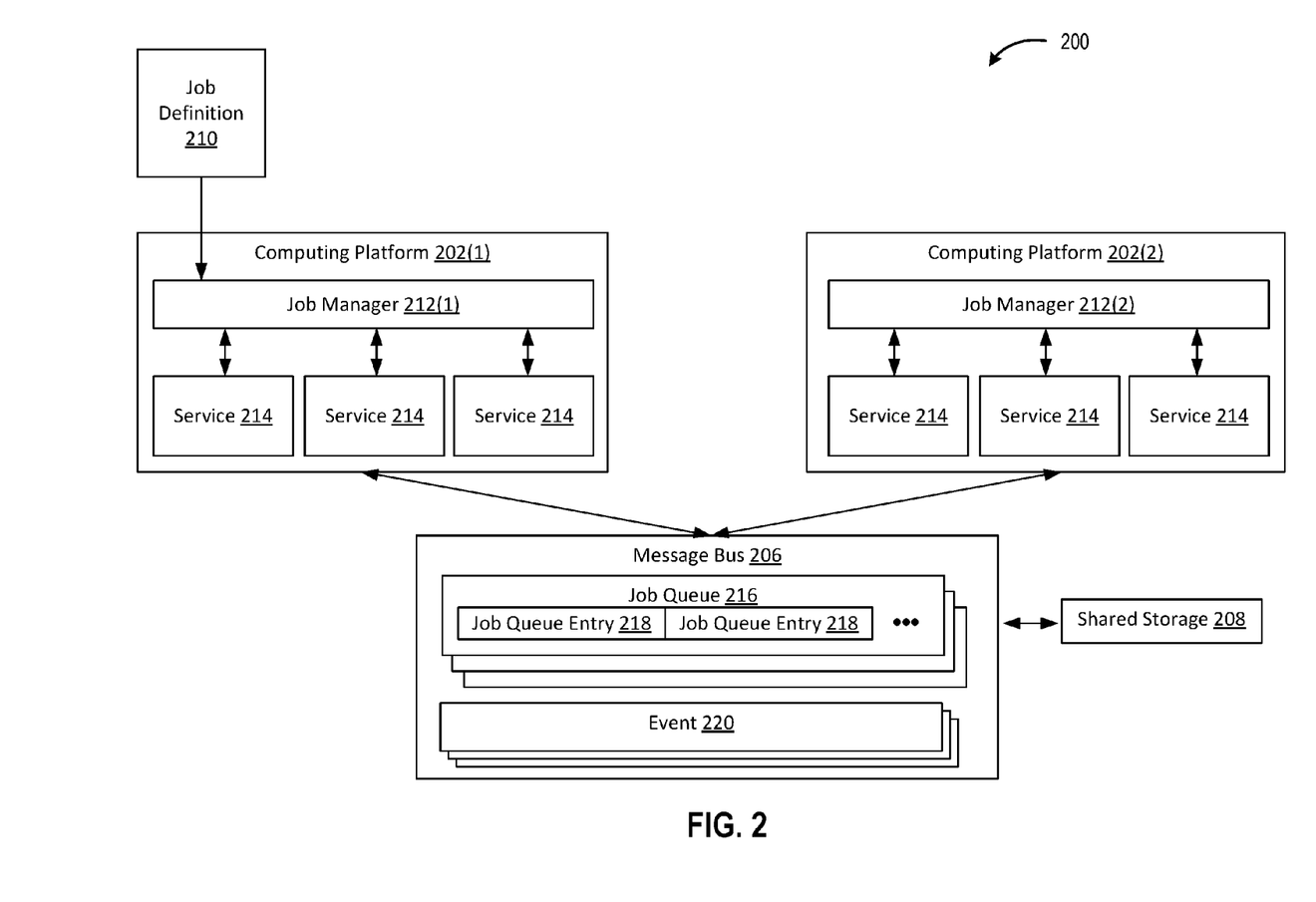
FIG. 2 is a block diagram of a hybrid task system, according to an example.

FIG. 2 is a block diagram of a hybrid task system 200, according to an example. As shown, hybrid task system 200 includes a first computing platform 202(1) and a second computing platform 202(2), as well as a message bus 206 and shared storage 208. Each computing platform 202 may be an on-premise computing system (such as virtualized computing system 102 of FIG. 1) or an off-premise or "cloud" computing system (such as cloud computing system 150 of FIG. 1). Note that for simplicity, hybrid task system 200 is shown with only two computing platforms 202 that are "remote" from each other, where the term "remote" refers generally to entities that are in substantially different physical locations (such as different buildings, different cities, or the like), and that may communicate via a computer network that is different than a local area network, such as via a public computer network like the Internet or a wide area network (WAN). However, hybrid task system 200 may include multiple computing platforms 202, each of which are remote from each other.

Computing platforms 202 cooperate to robustly execute computing "jobs." As described in more detail below, jobs are sets of tasks to be done within hybrid task system 200. Tasks are small units of work that accomplish a focused goal or set of goals. Although tasks can encompass a huge variety of operations, some examples of tasks include tasks related to virtual machines (such as starting up, shutting down, migrating, and performing bookkeeping for virtual machines), tasks related to virtual private networking, tasks related to networking (such as changing configuration of network appliances), and other tasks.

Each task within a job specifies a location at which it is to be performed, where "location" refers to a particular computing platform 202 of hybrid task system 200. Thus, each task within each job is able to be performed at any particular computing platform 202, meaning that two different tasks within the same job may be performed at different computing platforms 202.

To execute a job, job manager 212 receives a job definition 210, which may be provided directly by an administrator, via a file that stores job definitions 210, or through other means. A job definition 210 specifies a job type and defines allowed state transitions. A job type identifies a collection of tasks that may be completed for that job, while the state transitions identify the order in which tasks are to be completed. A job may also include a work flow type, which identifies a particular order of state transitions.

A job definition 210 may specify, for each state within the job, "allowed transitions," which indicate which states may transition to which other states. Allowed transitions may indicate that a particular state may transition to multiple other states, which is, effectively, a branch in control flow. Tasks are performed for each side of the "branch," and such tasks may be performed in parallel.

A job definition 210 may also include "join transitions," which indicate a joining of control flow. Join transitions allow control flow to come back together after branching. A join transition may indicate, for example, that tasks associated with two other states must be performed in order for the state associated with the join transition to be performed.

A job definition 210 may also include sub-workflows specified for one or more states. Sub-workflows are jobs that are to be completed before the state can be transitioned to the next allowable state or states. A sub-workflow is similar to a job and includes all features of jobs described herein.

An example job definition 210 is provided below in Table 1.

TABLE 1

Sample Job Definition
Job Definition

```
var jobDef = {
    jobType: 'JobTemplate'
    , workflowType: 'JobJoinTemplate'
    , states: [
        {
            state: 'JOIN_BEGIN'
            , allowedTransitions:['JOIN_STATE_ONE',
            'JOIN_STATE_TWO']
        }
        , {
            state: 'JOIN_STATE_ONE'
            , fromTransitions:['JOIN_BEGIN']
            , allowedTransitions: ['JOIN_STATE_THREE',
            'JOIN_STATE_ONE']
        }
        , {
            state: 'JOIN_STATE_TWO'
            , fromTransitions:['JOIN_BEGIN']
            , allowedTransitions:['JOIN_STATE_THREE']
            , subflow: {
                jobType: 'JobType'
                ,workflowType: 'JobSubworkflowTemplate'
            }
        }
        , {
            state: 'JOIN_STATE_THREE'
            , fromTransitions:['JOIN_STATE_ONE',
            'JOIN_STATE_TWO']
            , allowedTransitions:['JOIN_STATE_FOUR']
            , joinTransitions:[
                {state: 'JOIN_STATE_ONE', required: true}
                , {state: 'JOIN_STATE_TWO', required: true}
            ]
        }
        , {
            state: 'JOIN_STATE_FOUR'
            , fromTransitions:['JOIN_STATE_THREE']
        }
    ]
};
```

The sample job definition of Table 1 includes five states: "JOIN_BEGIN," "JOIN_STATE_ONE," "JOIN_STATE_TWO," "JOIN_STATE_THREE," and "JOIN_STATE_FOUR." The job definition specifies that from JOIN_BEGIN, JOIN_STATE_ONE and JOIN_STATE_TWO may be transitioned to. From JOIN_STATE_ONE, JOIN_STATE_THREE and JOIN_STATE_ONE may be transitioned to. Note that the indication that JOIN_STATE_ONE may transition again to JOIN_STATE_ONE, comprises a loop in control flow. From JOIN_STATE_TWO, JOIN_STATE_THREE is allowed to be transitioned to. The job definition also specifies that JOIN_STATE_TWO spawns a subflow of job type "JobType" and workflow type "JobSubworkflowTemplate." This means that this sub-workflow is to be completed before transitioning to the next state JOIN_STATE_THREE. From JOIN_STATE_THREE, JOIN_STATE_FOUR may be transitioned to. Note that JOIN_STATE_THREE specifies the two "join transitions" of "JOIN_STATE_ONE" and "JOIN_STATE_TWO," which means that in order for tasks associated with JOIN_STATE_THREE to begin, JOIN_STATE_THREE must have been transitioned to by both JOIN_STATE_ONE and JOIN_STATE_TWO. Finally, JOIN_STATE_FOUR is able to be transitioned to by JOIN_STATE_THREE.

Tasks, which are work executed in order to transition from one state to another, are executed by services 214. Specifically, services 214 listen for jobs of specific job types, at specific states. When a job associated with a particular service 214 reaches a state associated with that service, job manager 212 pushes that job to that service 214 for execution. Because any particular service 214 can be associated with one or more states within one or more jobs, any particular service 214, at any particular location, may perform tasks within various jobs.

Note that services 214 may be considered to be "microservices." A microservice is a service that performs a very small item of work (e.g., the tasks described herein). For any particular job, microservices that perform different tasks for the job may execute on different computer systems and at different locations (e.g., at on-premise computer system or an off-premise computer system). Among other benefits, splitting jobs up in this manner allows for scaling of work that may be deemed to bottleneck the entire job. Tasks performed by microservices may include changing a setting value (e.g., an IP address, a firewall setting, or the like), moving data, moving state data for a virtual machine (e.g., as part of a migration), registering or unregistering a VM at a particular location, or modifying or moving any other piece of data. Again, in general, these microservices perform individual tasks and can be scaled up (e.g., duplicated) in order to improve the workflow of a job.

Services 214 may run in special containers that are able to monitor execution of each service 214 and to quickly alter allocation of computing resources between services 214. Monitoring execution may include monitoring computer resource usage (e.g., CPU usage, memory usage, and the like) of the services 214. Altering allocation of computing resources may include scaling individual services 214 within the special containers. For example, the special containers may horizontally scale services 214 in that the special containers are able to remove certain services 214 from themselves in order to allocate additional computing resources (e.g., CPU time, threads) to a different service 214 for which scaling is desired. Each special container may be a process within a VM or a general purpose container such as a "Docker" container and may allocate services 214 running therein with computing resources such as threads, CPU time, and the like.

When a particular service 214 retrieves a job of a particular type and at a particular state, that service 214 executes the associated task, which performs certain payload work and also requeues the job for execution at a particular "transitioned to" state. In other words, the task causes the job to execute at a particular state that is one (or more) of the states for which transitioning to is allowed, per the job definition 210. Note that a single task may cause the job to execute at multiple states if allowed by the job definition 210. This would represent a branching point. The act of queuing a job places a job queue entry 218 within a job queue 216 managed by message bus 206. Queue entries 218 may include auxiliary data for "transmission" to the job at other states. Such auxiliary data can be used by the payload work of the tasks for whatever purpose deemed appropriate.

Message bus 206 stores job queues 216, each of which stores job queue entries 218. A job queue entry 218 includes a particular job definition 210, indicates the current state for that job queue entry 218, and includes whatever data is passed when the job queue entry 218 is queued for execution. Services 214 listening to jobs having a particular job type and a particular state receive those jobs from message bus 206 and execute the task associated with that job type and job state as described above.

Job managers 212 exist at each computing platform 202 and may be executed, for example, by or as part of hybrid cloud manager 132 in virtualized computing system 102 and hybridity director 174 in cloud computing system 150. Job managers 212 facilitate job execution in several ways. Job managers 212 receive job definitions 210 from external sources (such as, e.g., a web interface, persistent storage, a console, or the like). A job manager 212 that receives a job definition 210 examines that job definition 210 to determine a location (which, again, specifies a particular computing platform 202) at which to execute a task for the first state (or current if a state other than the first state is specified for execution) of that job definition 210. If the location is the same location at which the job manager is executing, then the job manager identifies a service 214 to execute the job based on the job type of the job definition and on the first (or current) state and pushes the job to the identified service. If the location is a different location as the location at which the job manager is executing, then the job manager identifies the specified location, and transmits the job definition to the job manager at that location, which identifies a service 214 at that location and passes a job to that service 214 for execution.

Job managers 212 control the workflow of jobs based on a job definition. A job definition may specify allowable transitions of states. For example, a job definition may specify that state one may transition to state 2 and that state 2 may transition to state 3. A job definition may specify a "branch" in workflow. Specifically, a job definition may specify that a particular state may transition to two or more other states. For example, a job definition may specify that state 1 may transition to both state 2 and state 3. A job definition may also specify that in order to transition to a particular state, completion of multiple previous states must happen. For example, a job definition may specify that in order for state 3 to be arrived at, both states 1 and 2 must complete their tasks that cause transition to state 3.

Job manager 212 causes jobs to be pushed to listening services 214 based on the job definition and the allowable transitions. If a task causes a transition to a particular state and the job definition allows transition to that state, then job manager 212 pushes the job to the appropriate service, specifying the transitioned-to state. If a job definition only allows transition to a particular state after completion of tasks associated with multiple previous states, then job manager 212 only pushes the job to an appropriate service 214 upon determining that those previous states have completed. If a job definition specifies a sub-workflow, then job manager 212 begins that workflow and only allows transition to a subsequent state after completion of that sub-workflow.

Each time a particular task is completed, such completion is recorded in shared storage 208. Because task completion is recorded, tasks that do not complete may be retried at a later time. To facilitate this type of fault tolerance, each task is idempotent and re-entrant. Idempotency means that a task, whether run once or multiple times, has the same result. In one example, a task may cause a particular virtual machine 120 to migrate from computing platform 202(1) to computing platform 202(2). One task associated with such a job may cause data associated with a particular virtual machine 120 to be transferred from computing platform 202(1) to computing platform 202(2). If completed a first time, this task would result in the data moving, but if completed a second time, no data would be moved, as the data requested to be moved would have already been moved. Re-entrancy means that a task may be interrupted in the middle of execution and then safely invoked again before previous invocations complete.

Note that "branches" of a job may be performed in parallel. Specifically, different threads in a particular service 214, or different services, may perform tasks associated with different branches. Also, multiple jobs may be performed in parallel in a similar manner. For example, if two or more jobs of the same type are launched, a single service 214, or multiple services 214, may perform the tasks specified by the jobs, in parallel.

Job managers 212 perform scaling of services 214 for efficient execution of tasks. Specifically, a job manager 212 monitors each service 214 executing in the same location as the job manager and determines whether any services are using above a threshold amount of assigned computing resources. Services 214 may be allotted particular amounts of computing resources such as threads and memory. A job manager 212 may determine that any particular service 214 is using a number of resources that exceeds a threshold associated with that allotment (where the threshold may be a certain percentage less than 100% of that allotment). In response to such determination, the job manger spawns a new service 214 that executes the same tasks (i.e., workflow/state combination) as the service for which the computing resources used exceeds the threshold. Because each service 214 "pulls" jobs from message bus 206 (by subscribing to jobs managed by the message bus) that are in a state that can be executed by that service 214 (i.e., services 214 pull "tasks" appropriate for that service 214 from message bus 206), spawning more services 214 for any particular task increases the number of computing resources available to execute that task, thus allowing for horizontal scaling of any particular task. Job managers 212 may also despawn services 214 when they are underutilized (e.g., the number of computing resources used is under a particular threshold).

Job managers 212 may also recognize when a particular service 214 fails for some reason. In such instance, job manager 212 re-queues tasks being executed by that service 214. Since tasks are idempotent and reentrant, work associated with such tasks can be reexecuted even if that work was partially executed by the service that failed. Services 214 may explicitly indicate that they failed in executing a task, passing a message to message bus indicating that they failed in executing the task. Alternatively, services 214 may become unavailable (e.g., may crash, become unresponsive, or otherwise be unable to perform a task). In these situations, job manager 212 detects service unavailability and publishes the jobs being executed by such unavailable services to message bus 206 for re-execution. Job manager 212 may spawn a new service 214 to execute such tasks if desired.

Job managers 212 or services 214 (or other entities in hybrid task system 200) may generate events. Services 214 may listen for events and spawn jobs in response to detecting a particular event. Events may include indicate various things such as that a particular task or job is complete, that a particular job has reached a particular state, or that other events have happened. When an entity generates an event, the entity publishes the event to message bus 206 (which is shown as including several events 220).

Message bus 206 stores job queue entries 218 and events 220 in shared storage 208 for persistence of state. These items can be stored when received by message bus 206.

Note that each particular service 214 may execute tasks from different sources, since message bus 206 is shared between "locations." Thus, a service 214 may execute a task from a job generated by a first on-premise computing system as well as a second on-premise computing system (as well as any other computing systems that have access to message bus 206).

Figure 3:
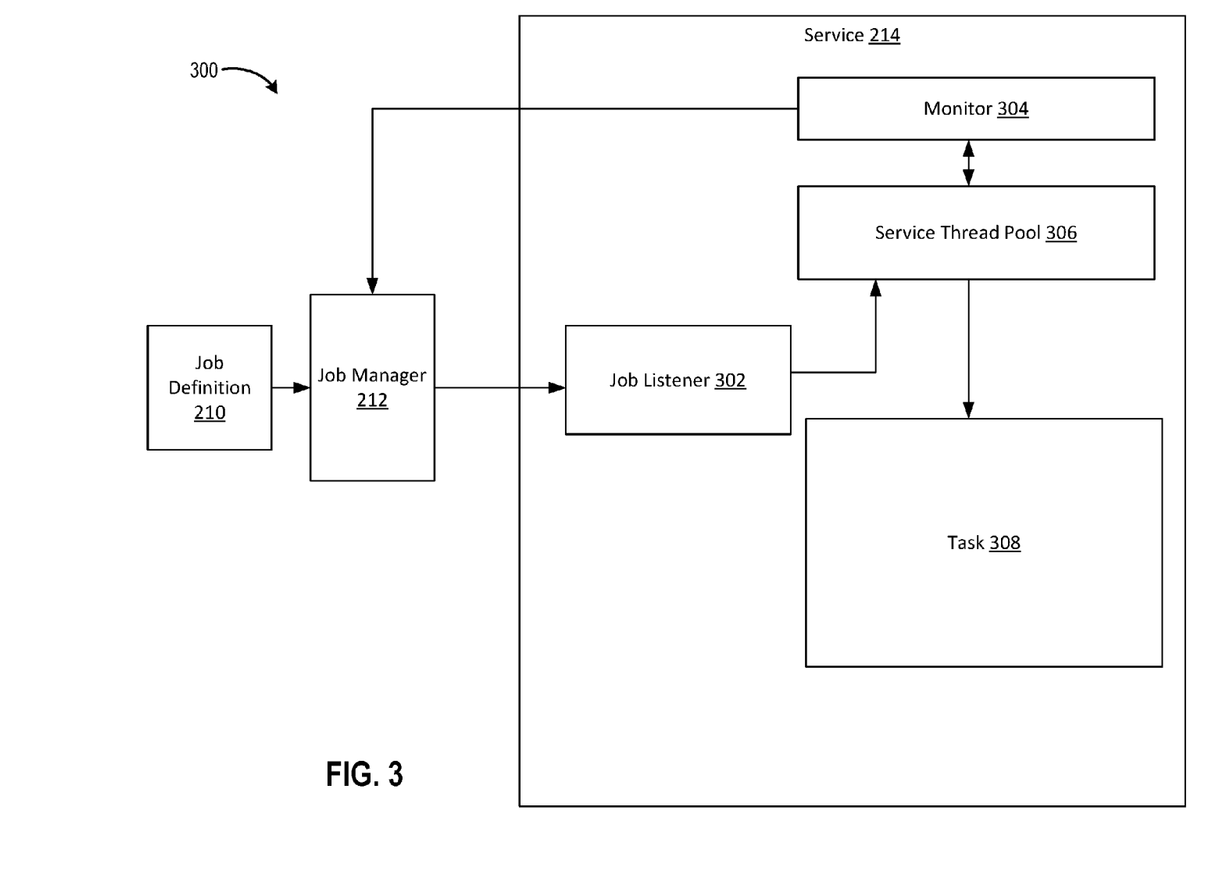
FIG. 3 is a block diagram illustrating a service-to-job manager interface, according to an example.

FIG. 3 is a block diagram illustrating a service-to-job manager interface 300, according to an example. The service-to-job manager interface 300 includes a job manager 212, interfacing to a service 214. Job manager 212 receives a job definition 210 and transmits a job to job listener 302, which listens for jobs of a certain type and at a certain state. Service thread pool 306 of service 214 includes one or more threads configured to execute the task 308 associated with service 214. Monitor 304 monitors usage of service thread pool 306, communicating status to job manager 212 so that job manager 212 can perform functionality such as load balancing, fault handling, and the like.

Figure 4:
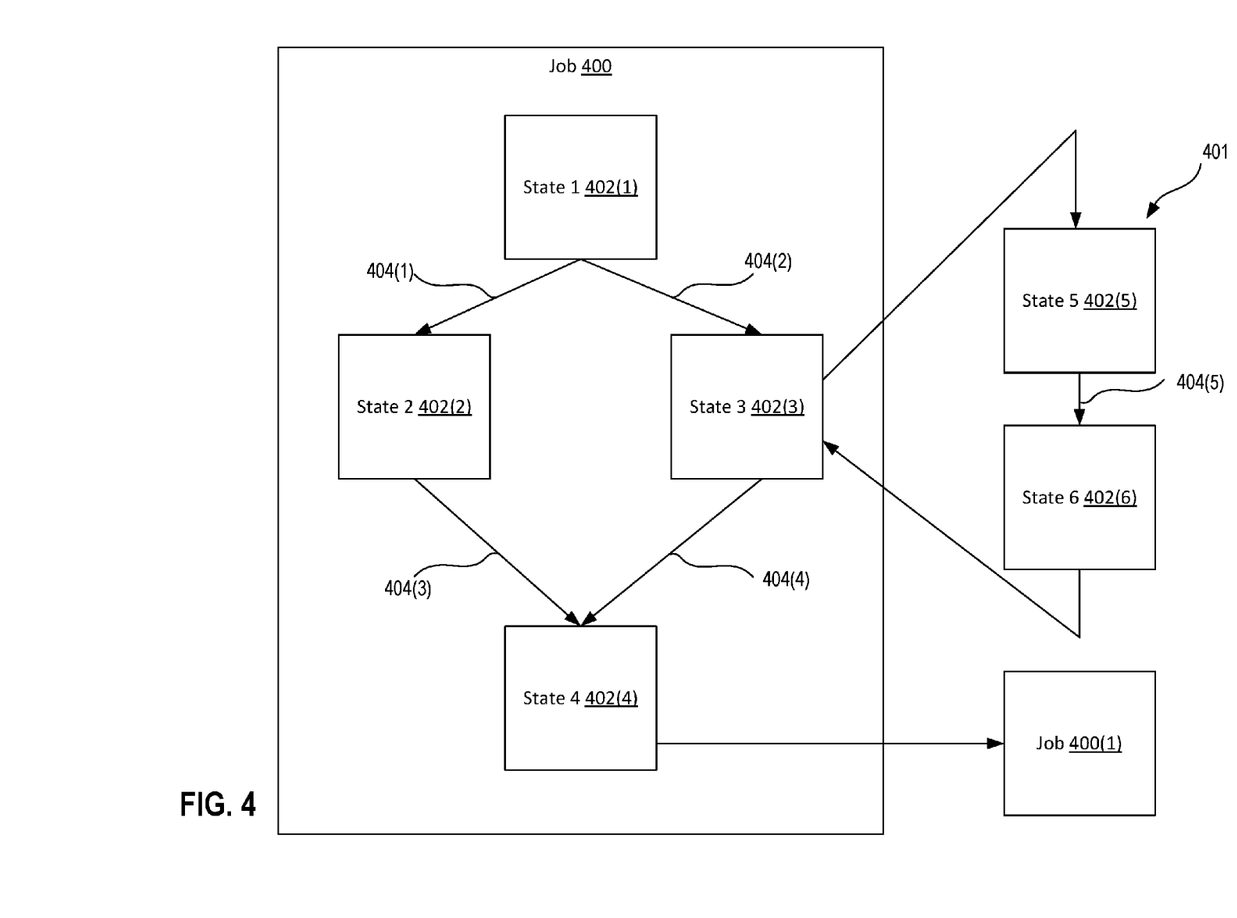
FIG. 4 is a block diagram illustrating example workflow for a job, according to an example.

FIG. 4 is a block diagram illustrating example workflow for a job 400, according to an example. As shown, job 400 includes several states 402 that are traversed to via tasks 404. In this example job 400, state 1 402(1) may transition to state 2 402(2) and state 3 402(3) via task 1 404(1) and task 2 404(2), respectively. State 4 402(4) is transitioned to when both task 3 404(3) and task 4 404(4) are complete.

Job 400 includes a sub-workflow 401, which includes two states 402 separated by a task 404(5). Job 400 may specify that state 3 402(3) is not complete until state 5 402(5) has transitioned to state 6 402(6) and sub-workflow 401 has completed. Additionally, job 400 indicates that when state 4 402(4) has been arrived at, another job 400(1) is spawned. Note that any of tasks 404 can be executed at any particular location, as specified in job definition 210.

Figure 5:
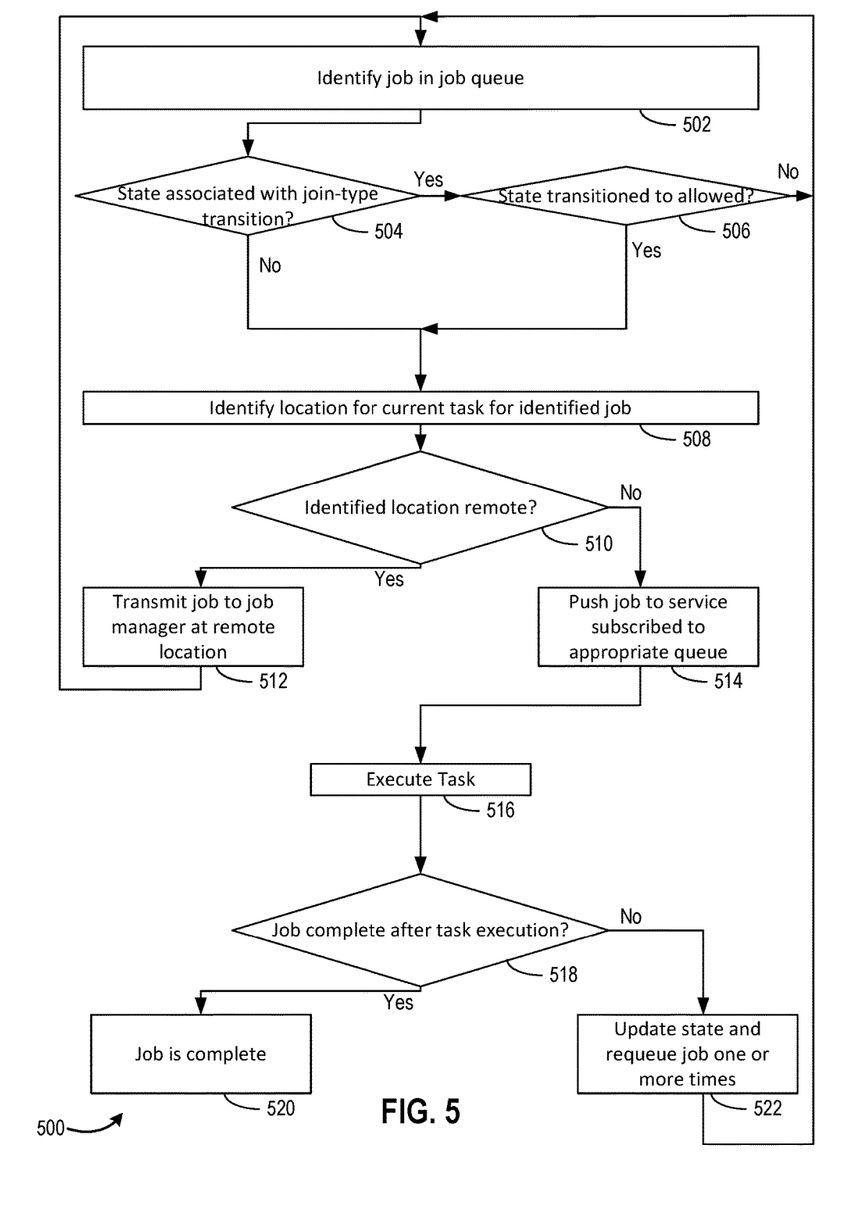
FIG. 5 is a flow diagram of method steps for executing jobs in a hybrid cloud system, according to an example.

FIG. 5 is a flow diagram of method steps for executing jobs in a hybrid cloud system, according to an example. Although described with respect to the system of FIGS. 1-3, it should be understood that any system, performing the operations of FIG. 5 various technically feasible orders, is within the scope of the present disclosure.

As shown, a method 500 begins at step 502, where a job manager 212 retrieves a job in a job queue 216. Note that this job may be placed there by a service 214, when executing a task, or may be placed by a job manager after retrieving and processing a job description 210. Job manager 212 also identifies a state of the job in job queue 216. At step 504, job manager 212 determines whether the state of the retrieved job is associated with a join type transition. Such a transition would be specified in the corresponding job description 210, by indicating that tasks associated with more than one other state must be completed, and must transition to the currently specified state, in order for the task associated with the currently specified state to begin. If the state is associated with a join-type transition, then method 500 proceeds to step 506 and if the state is not associated with a join-type transition, then method 500 proceeds to step 508.

At step 506, job manager 212 determines whether the state transitioned to for the join-type transition is allowed. If tasks associated with all states indicated as being required have been completed for the job, then the state transitioned to is allowed and the method proceeds to step 508. If tasks associated with all states indicated as being required have not been completed, then method 500 returns to step 502, where job manager 212 retrieves another job for issuance. If tasks associated with all states indicated as being required have been completed, then method 500 proceeds to step 508. Note that tasks may be completed in parallel and that because each task pushes a job onto a job queue 216, although some job queue entries will be examined by job manager 212 when not all tasks have been completed for a join-type transition, one of the job queue entries in a job queue 216 will be retrieved and examined by job manager 212 when all required tasks have been finished for a particular join state. At this time, job manager 212 would push that particular job to an appropriate service 214 for execution.

At step 508, job manager 212 identifies a location for the retrieved job/state combination. The location specifies a particular computing system such as a virtualized computing system 102 (i.e., an on-premise computing system) or a cloud computing system 150 (i.e., an off-premise computing system). The job description for a particular job may specify what location each task in that job is to execute at. Different tasks within a single job may specify execution at different locations.

At step 510, job manager 212 determines whether the identified location is remote. If the identified location is remote, then method 500 proceeds to step 512 and if the identified location is not remote, then method 500 proceeds to step 514.

At step 512, job manager 212 transmits the retrieved job to a job manager 212 at the specified remote location for further processing. That job manager 212 may requeue the job (and dequeue the job, beginning at step 502), processing it immediately (steps 504 onwards), or otherwise handle the transmitted job. After step 512, method 500 returns to step 502, where the local job manager retrieves another job in a job queue. At step 514, if the location for the task is local, then job manager 212 pushes the job to the service that is subscribed to the queue from which the job was retrieved. Jobs may be queued to queues associated with a particular service 214, based on the job type, state, and workflow type, which would allow services 214 to retrieve only jobs for which work is to be done by that service 214.

At step 516, the service that received the job executes the task. At step 518, that services 214 determines whether execution is complete. If execution is complete, then method 500 proceeds to step 520, where an event is generated indicating that the job is complete and no new job is requeued. If execution is not complete, then method 500 proceeds to step 522, where service 214 queues jobs for one or more subsequent states. Job queues for multiple states would be associated with a "branch" of the job workflow. After step 522, method 500 returns to step 502, where job manager 212 identifies another job in the queue.

Note that although the steps are depicted in a certain order, step ordering may be changed. For example, step 508 (identifying location) and step 504 may reverse positions so that the state transition type is checked only if the job is to be processed locally. Other changes in order are of course possible.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers". OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities —usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for executing jobs in a hybrid cloud computing system, the method comprising:

inserting a first job to a first job queue for execution by queuing the first job based on a job type of the first job, a first state of the first job and a workflow type of the first job, wherein the first state identifies a task of the first job for execution, wherein the first job comprises a plurality of tasks for starting up, shutting down or migrating virtual machines;

retrieving the first job from the first job queue;

determining that the first state of the retrieved job is not associated with a join type transition, wherein the join type transition requires that tasks associated with more than one other state are to be completed and transitioned to the first state in order for the task associated with the first state to begin execution;

in response to determining that the first state of the retrieved job is not associated with the join type transition, determining that a location associated with the first state is a private cloud computing system within the hybrid cloud computing system;

in response to determining that the location associated with the first state is the private cloud computing system, transmitting the first job to the location for execution by a service subscribed to the first job queue from which the first job is retrieved;

determining whether the execution of the first job is complete; and in response to determining that the execution of the first job is complete, generating an event indicating that the first job is complete, or in response to determining that the execution of the first job is not complete, requeuing the first job for one or more subsequent states.

2. The method of claim 1, wherein transmitting the first job to the location for execution comprises:
transmitting the first job to one of the private cloud computing system and a public cloud computing system.

3. The method of claim 1, further comprising:
executing the first job at the location by the service that is subscribed to execute the first job at the first state.

4. The method of claim 3, wherein executing the first job at the location by the service comprises:
receiving the first job at the location;
queueing the first job in a queue;
retrieving, at the location, from the queue, the first job;
identifying the service based on the first job and the first state; and
pushing the first job to the service for execution.

5. The method of claim 3, wherein executing the first job at the location comprises:
queuing the first job for execution with a second state after executing the first job at the location with the first state.

6. The method of claim 5, wherein executing the first job at the location further comprises:
queueing the first job for execution with a third state after executing the first job at the location with the first state.

7. The method of claim 6, wherein:
execution of the first job at the second state and at the third state is performed in parallel.

8. The method of claim 5, wherein executing the first job at the location further comprises:
queueing a sub-workflow for execution; and
waiting for the sub-workflow to complete before queueing the first job for execution with the second state.

9. A computer system for executing jobs, the computer system comprising:
a processor configured to:
insert a first job to a job queue for execution by queuing the first job based on a job type of the first job, a first state of the first job and a workflow type of the first job, wherein the first state identifies a task of the first job for execution, wherein the first job comprises a plurality of tasks for starting up, shutting down or migrating virtual machines,
retrieve the first job from the job queue;
determine that the first state of the retrieved job is not associated with a join type transition, wherein the join type transition requires that tasks associated with more than one other state are to be completed and transitioned to the first state in order for the task associated with the first state to begin execution,
in response to determining that the first state of the retrieved job is not associated with the join type transition, determine that a location associated with the first state is associated with a private cloud computing system within a hybrid cloud computing system,
in response to determining that the location associated with the first state is the private cloud computing system, transmit the first job to the location for execution by a service subscribed the job queue from which the first job is retrieved, determine whether the execution of the first job is complete, and in response to determining that the execution of the first job is complete, generate an event indicating that the first job is complete, or in response to determining that the execution of the first job is not complete, requeue the first job for one or more subsequent states.

10. The system of claim 9, wherein the processor is configured to transmit the first job to the location by:
transmitting the first job to one of the private cloud computing system and a public cloud computing system.

11. The system of claim 9, wherein the private cloud computing system or the public cloud computing system is configured to:
execute the first job by the service that is subscribed to execute the first job at the first state.

12. The system of claim 11, where the private cloud computing system or the public cloud computing system is configured to execute the first job by:
receiving the first job;
inserting the first job in a queue;
retrieving from the queue, the first job;
identifying the service based on the first job and the first state; and
pushing the first job to the service for execution.

13. The system of claim 11, wherein the private cloud computing system or the public cloud computing system is configured to execute the first job by:
queuing the first job for execution with a second state after executing the first job at the location with the first state.

14. The system of claim 13, wherein the private cloud computing system or the public cloud computing system is configured to execute the first job by:
queueing the first job for execution with a third state after executing the first job at the location with the first state.

15. The system of claim 14, wherein:
execution of the first job at the second state and at the third state is performed in parallel.

16. The system of claim 13, wherein the private cloud computing system or the public cloud computing system is configured to execute the first job by:
queueing a sub-workflow for execution; and
waiting for the sub-workflow to complete before queueing the first job for execution with the second state.

17. A non-transitory computer-readable medium storing instructions that, when executed by a processor, cause the processor to perform a method, the method comprising:
inserting a first job to a first job queue for execution by queuing the first job based on a job type of the first job, a first state of the first job and a workflow type of the first job, wherein the first state identifies a task of the first job for execution, wherein the first job comprises a plurality of tasks for starting up, shutting down or migrating virtual machines;
retrieving the first job from the first job queue;
determining that the first state of the retrieved job is not associated with a join type transition, wherein the join type transition requires that tasks associated with more than one other state are to be completed and transitioned to the first state in order for the task associated with the first state to begin execution;
in response to determining that the first state of the retrieved job is not associated with the join type transition, determining that a location associated with the first state is a private cloud computing system within the hybrid cloud computing system;

in response to determining that the location associated with the first state is the private cloud computing system, transmitting the first job to the location for execution by a service subscribed to the first job queue from which the first job is retrieved;

determining whether the execution of the first job is complete; and in response to determining that the execution of the first job is complete, generating an event indicating that the first job is complete, or in response to determining that the execution of the first job is not complete, requeuing the first job for one or more subsequent states.

18. The non-transitory computer-readable medium of claim 17, wherein transmitting the first job to the location for execution comprises:

transmitting the first job to one of the private cloud computing system and a public cloud computing system.

* * * * *